United States Patent [19]

Seidler

[11] 4,284,560
[45] Aug. 18, 1981

[54] PROCESS FOR THE PREPARATION OF COMPLEX COMPOUNDS OF THE COBALT PHTHALOCYANINE SERIES

[75] Inventor: Helmut Seidler, Bad Godesberg, Fed. Rep. of Germany

[73] Assignee: Bayer Aktiengesellschaft, Leverkusen, Fed. Rep. of Germany

[21] Appl. No.: 761,328

[22] Filed: Jan. 21, 1977

[30] Foreign Application Priority Data

Jan. 24, 1976 [DE] Fed. Rep. of Germany ....... 2602644

[51] Int. Cl.$^3$ ............................................. C09B 47/22
[52] U.S. Cl. .............................. 260/314.5; 260/242.2; 260/245.1
[58] Field of Search ................ 260/314.5, 242.2, 245.1

[56] References Cited

U.S. PATENT DOCUMENTS 3,619,109  11/1971  Vollman et al. .............. 260/314.5 X
3,972,893   8/1976  Tanaka ........................... 260/314.5

FOREIGN PATENT DOCUMENTS 1619546  2/1971  Fed. Rep. of Germany .

Primary Examiner—Richard Raymond
Attorney, Agent, or Firm—Sprung, Felfe, Horn, Lynch & Kramer

[57] ABSTRACT

Coordinatively hexavalent complex salts of trivalent cobalt, in which four of the six coordination positions on the cobalt are occupied by the doubly negatively charged phthalocyanine ring system and the remaining two coordination positions are each occupied by an amine from the series of primary, secondary or tertiary aliphatic, aromatic or heterocyclic monoamines or polyamines and which are obtained by reaction of cobalt phthalocyanine compounds with primary, secondary or tertiary, aliphatic, aromatic or heterocyclic amine are prepared according to an improved process in that the cobalt phthalocyanine compounds used are those in which the central cobalt atom is present in the trivalent state, and which contain anions, bonded in the form of salts, from the series fluoride, chloride, bromide and iodide.

3 Claims, No Drawings

PROCESS FOR THE PREPARATION OF COMPLEX COMPOUNDS OF THE COBALT PHTHALOCYANINE SERIES

The subject of the invention is a process for the preparation of coordinatively hexavalent complex salts of trivalent cobalt, in which 4 of the 6 coordination positions on the cobalt are occupied by the doubly negatively charged phthalocyanine ring system and the remaining two coordination positions are each occupied by an amine from the series of primary, secondary or tertiary aliphatic, aromatic or heterocyclic monoamines or polyamines.

The compounds to be prepared according to the invention are known, for example, from German Patent Specification Nos. 1,569,753 and 1,619,546. They are extremely valuable dyestuffs for cotton and regenerated cellulose, since, used in a simple manner, they are able to provide very fast dyeings in clear and deep blue shades.

The cobalt phthalocyanine/amine complex salts have hitherto been prepared either by oxidation of cobalt phthalocyanines in the presence of an amine and of a source of anions, or by reaction of cobalt phthalocyanines, which contain one or two halogen atoms covalently bonded to the central cobalt atom, with amines.

Two technical variants of the said syntheses consist of either treating cobalt phthalocyanine, suspended in an amine, in the presence of a source of anions, with air as the oxidising agent at an elevated temperature, or converting cobalt phthalocyanine by means of elementary chlorine or bromine into the halogen compounds characterised above and reacting the product, in a second stage, with amines.

It has now been found, surprisingly, that cobalt phthalocyanines in which the central cobalt atom is present in the oxidised trivalent form, and which contain an anion bonded in the form of a salt, react extremely easily with amines to give the known cobalt phthalocyanine/amine complex salts. The preparation of these phthalocyanine-cobalt (III) complexes with an anion bonded in the form of a salt, for example chloride and bromide, is known from Inorg. Chem. 14 (1975), 461–468, and can also be used in a similar manner for the preparation of corresponding fluorides and iodides.

The synthesis is carried out by converting the cobalt phthalocyanine in aqueous suspension, in the presence of the acid corresponding to the stated anions, into the stated salts by oxidation with air or pure oxygen, at an elevated temperature. The salts are isolated by filtration and are washed and then dried at an elevated temperature.

The cloride compound prepared in this way has proved very particularly advantageous for the subsequent reaction with amine.

The further reaction of the cobalt-III phthalocyanine salts with the amines can be carried out at temperatures of 20° to 100° C., but because of the high reactivity of the category of compounds it is preferably carried out at 20° to 50° C.; the reaction is carried out either in organic solvents such as nitrobenzene, halogenated aromatic and aliphatic hydrocarbons, aromatic or aliphatic alcohols, ethers or glycols, or in an excess of the corresponding amine.

The course of the reaction is such that the amine complex salts to be prepared crystallise out from the reaction mixture after a very short reaction time and are isolated in a very pure form, after the reaction has ended, by filtering off and washing with suitable solvents.

The amine complex salts can, however, also be obtained advantageously in such a way as to recover the solvent used, by evaporating the reaction mixture under reduced pressure and at low temperatures.

The cobalt phthalocyanines used as starting materials for the process mentioned can be substituted by 1 to 4 $C_1$–$C_4$-alkyl groups, 1 to 4 $C_1$–$C_4$-alkoxy groups, 1 to 4 phenyl groups or 1 to 16 halogen atoms, preferably chlorine or bromine atoms, in the benzene radicals.

Preferably, however, the cobalt phthalocyanine is unsubstituted in the benzene nuclei.

Examples of suitable aliphatic, aromatic and heterocyclic monoamines and polyamines are primary alkylamines and hydroxyalkylamines such as n-butylamine and hydroxyethylamine, benzylamine, aniline and its methyl and methoxy derivatives, such as p-toluidine and anisidine, heterocyclic amines, such as 2-aminothiazole and 2-aminopyridine, secondary amines with 2-alkyl or hydroxyalkyl groups, such as diethylamine or N-methylethanolamine, and amines of cyclic structure, such as piperidine, morpholine and N-methylpiperazine, tertiary alkylamines and tertiary nitrogen bases, such as tetramethylethylenediamine or 1-dimethylaminopropan-2-ol, including those having a cyclic structure of aromatic character, such as pyridine or 2-methylimidazole and 1-amino-3-iminoisoindolenine, as well as polyamines, such as ethylenediamine, 1-amino-3-dimethylaminopropane, 1-amino-3-diethylaminopropane, bis-1,2-dimethylaminoethane or bis-[3-aminopropyl]-methylamine.

Amines of the formula

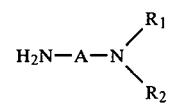

wherein

A represents an ethylene or propylene radical, $R_1$ represents hydrogen, methyl or ethyl and $R_2$ represents hydrogen, methyl or ethyl are preferred.

A particular advantage of the process described which should be singled out is that even cobalt phthalocyanines of low purity can be converted into the amine complex salts with excellent yields.

EXAMPLE 1

80 g of a phthalocyanine-cobalt (III) chloride are suspended in 350 ml of chlorobenzene. 34 g of 3-dimethylaminopropylamine are added dropwise to the mixture, whilst stirring, whereupon the crystallisation of the dyestuff of the formula

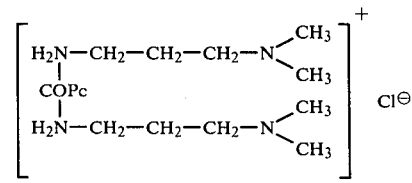

starts after only 1 minute. The mixture is stirred for a further 2–3 hours at room temperature and the dyestuff is isolated by filtration, washing with chlorobenzene and drying at 50° C. in vacuo. 105 g of a product which is identical with the dyestuff described in Example 5 of German Patent Specification No. 1,569,753 are obtained.

The phthalocyanine-cobalt (III) chloride was synthesised as follows:

50 g of a cobalt phthalocyanine of about 92% purity are stirred in 500 g of concentrated aqueous hydrochloric acid for 5 hours at 70° C., whilst introducing a vigorous stream of air. After the mixture has cooled, the product is filtered off, washed with water until neutral and dried at 100° C. 53.5 g of a solid having a halogen content of 7.1% of chlorine, which latter is essentially bonded in the ionic form, are obtained. A cobalt phthalocyanine which is of substantially lower purity because of impurities which are still present can in principle be employed in the same way in the reaction without detriment to the quality and yield of the phthalocyanine-cobalt (III) chloride.

EXAMPLE 2

12.6 g of a phthalocyanine-cobalt (III) chloride, prepared as described in Example 1, are suspended in 50 ml of toluene and 6.5 g of 3-dimethylaminopropylamine are added, whilst stirring. The crystallisation of the dyestuff, which starts immediately, has ended after 3 hours at room temperature. The product is filtered off, washed with toluene and dried in vacuo at 50° C. The yield is 15 g of a product which is identical with the dyestuff of Example 1.

If the 3-dimethylaminopropylamine is replaced by equivalent amounts of 1,2-diaminoethane, 2-methylaminoethylamine, 2-dimethylaminoethylamine, 1,3-diaminopropane, 1-amino-3-methylaminopropane, 1-amino-3-ethylaminopropane or 1-amino-3-diethylaminopropane, corresponding dyestuffs are obtained.

EXAMPLE 3

45 g of a phthalocyanine-cobalt (III) chloride, prepared as described in Example 1, are introduced into 150 g of 3-dimethylaminopropylamine, whilst stirring. The reaction starts with a temperature rise to almost 50° C. The reaction is complete after stirring for 1 to 2 hours at room temperature. The dyestuff is filtered off, washed with a small amount of pure 3-dimethylaminopropylamine and then with water, and dried in vacuo at 50° C. 55 g of a very pure product, which is identical with the dyestuff of Example 1, are obtained.

EXAMPLE 4

45 g of a phthalocyanine-cobalt (III) bromide are suspended in 200 ml of chlorobenzene and 20 g of 1-amino-3-methylaminopropane are added at room temperature, whilst stirring. The mixture is stirred for 3 hours at room temperature and the dyestuff, which is obtained as green crystals, is isolated by filtration and washing with pure solvent. After drying at 50° C. in vacuo, 60 g of a dyestuff of the formula

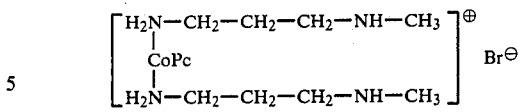

are obtained.

Phthalocyanine-cobalt (III) bromide is prepared as described in Example 1, by treating a mixture of 50 g of previously purified cobalt phthalocyanine and 500 g of concentrated aqueous hydrobromic acid for about 30 hours with air at 70° C. After isolation, 55 g of a dyestuff, which contains 12% of bromine, which is essentially bonded in the ionic form, are obtained.

EXAMPLE 5

35 g of a phthalocyanine-cobalt (III) chloride, prepared as described in Example 1, are suspended in 175 ml of chlorobenzene and 15 g of 3-dimethylaminopropylamine are added whilst stirring. After stirring for three hours at room temperature, the suspension is evaporated to dryness under a pressure of about 20 mm Hg and at temperatures of 50°–60° C., with recovery of the chlorobenzene employed. After grinding the residue, 48 g of a dyestuff, which is identical with the product prepared in Example 1, are obtained.

EXAMPLE 6

35 g of a phthalocyanine-cobalt (III) chloride, prepared as described in Example 1, are suspended in 175 ml of methanol and 15 g of 3-dimethylaminopropylamine are added whilst stirring. After stirring for three and a half hours at room temperature, the suspension is evaporated to dryness under a pressure of about 10 mm Hg and at temperatures of 50°–60° C., with recovery of the methanol employed. 43.5 g of a dyestuff, which is identical with the product prepared in Example 1, are obtained.

I claim:

1. Process for the preparation of a complex salt of trivalent cobalt having six coordinate bonds, four of which are occupied by a phthalocyanine ring system having two negative charges and the remaining two of which are each occupied by a primary, secondary, or tertiary aliphatic, aromatic, or heterocyclic monoamine or polyamine which comprises reacting cobalt phthalocyanine with oxygen and a halogen acid to produce the corresponding cobalt (III) phthalocyanine halide, which is then reacted with said amine to produce said complex salt in a highly purified form.

2. Process of claim 1 wherein the reaction of said cobalt (III) phthalocyanine halide and amine is carried out at 20°–100° C. in an inert organic solvent or in an excess of said amine.

3. Process of claim 1 wherein said amine has the formula

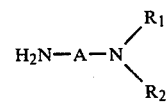

wherein A is dimethylene or trimethylene; and $R_1$ and $R_2$ are hydrogen, methyl, or ethyl.